Patented July 29, 1952

2,605,270

UNITED STATES PATENT OFFICE 2,605,270

AMIDES OF 9,10-DIHYDROXYSTEARIC ACID

Daniel Swern, Edward T. Roe, and John T. Scanlan, Philadelphia, Pa., assignors to the United States of America as represented by the Secretary of Agriculture No Drawing. Application June 21, 1949, Serial No. 100,523

4 Claims. (Cl. 260—404)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to N-substituted amides of 9,10-dihydroxystearic acids and has among its objects the provision of such compounds and processes for their preparation.

We have found that N-alkylamides and N-alkylolamides of 9,10-dihydroxystearic acid are produced on heating the acid at reaction temperature with an alkylamine or an alkylolamine, respectively, wherein the alkyl groups may be either straight or branched chains, and wherein each of the alkyl groups contain, preferably, at least five carbon atoms. The 9,10-dihydroxystearic acid used may be of the low melting isomeric form (M. P. 95° C.) or of the high melting isomeric form (M. P. 130° C.). The amides so obtained are useful as components of high melting waxes, and as intermediates in the production of wetting agents and other synthetic products. These amides may be represented by the formula

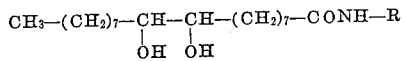

wherein R is a member of the group consisting of alkyl and hydroxyalkyl.

The following examples are illustrative of the invention:

Example I

Twenty grams (0.063 mole) of 9,10-dihydroxystearic acid (M. P. 95° C.) and 10.0 g. (0.064 mole) of n-decylamine were weighed into a three-neck flask fitted with a West condenser in an upright position. The apparatus was flushed out with nitrogen, and then the flow of inert gas was reduced to the lowest possible rate to exclude air without driving off the amine. The mixture was heated rapidly to about 230° C. and maintained at this temperature for about thirty-five minutes. To facilitate removal of water vapor from the reaction zone, steam was passed down through the water jacket of the condenser. On completion of the reaction, the contents of the flask were cooled and the solidified reaction mixture was dissolved in about 175 ml. of 95% ethanol, treated with 0.6 g. of decolorizing carbon, and filtered hot. The solvent-solute ratio of the filtrate was adjusted to 8 ml. of solvent per gram of solute, and the solution cooled to 0° C. The precipitate thus obtained weighed 24.7 g. and consisted of substantially pure N-(n-decyl)-9,10-dihydroxystearamide, M. P. 106.0°–106.5° C.

Example II

Twenty grams (0.063 mole) of 9,10-dihydroxystearic acid (M. P. 130° C.) and 5.8 g. (0.095 mole) of 2-hydroxyethylamine (ethanolamine) were refluxed for 15 minutes. The N-(2-hydroxyethyl)-9,10-dihydroxystearamide, M. P. 152.0° C., was recovered from the reaction mixture as described in the foregoing example, except that 18 ml. of solvent were employed for each gram of solute and two crystallizations were required.

The method of this invention is applicable, in general, to the production of any N-alkylamide or N-alkylolamide of the high melting or low melting isomeric forms of 9,10-dihydroxystearic acid. Thus, by replacing in the foregoing examples, n-decylamine and 2-hydroxyethylamine by equivalent amounts of other alkylamines and alkylolamines, wherein the alkyl groups may be either straight chain or branched chains, such as amyl, hexyl, octyl, dodecyl, tetradecyl, hexadecyl, hydroxypropyl, and hydroxybutyl, the corresponding N-substituted amides of 9,10-dihydroxystearic acid are obtained. Reaction temperatures between about 150 and 250° C. may be used.

The melting points of some of these amides, wherein R has the values shown below in the following formula,

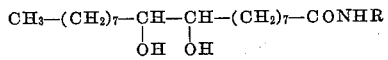

are listed in the following table:

| R | Amides of Low Melting 9,10-Dihydroxystearic acid (M. P. °C.) | Amides of High Melting 9,10-Dihydroxystearic acid (M. P. °C.) |
|---|---|---|
| n-Amyl | 101.0 | 140.5 |
| n-Decyl | 106.5–107.0 | 140.5 |
| n-Octadecyl | 107.5–108.0 | 139.5–140.0 |
| 2-Hydroxyethyl | 110.5–111.0 | 152.0 |

We claim:

1. A hydroxyalkyl amide of 9,10-dihydroxystearic acid.
2. N-(2-hydroxyethyl)-9,10-dihydroxystearamide.
3. A process comprising heating 9,10-dihydroxystearic acid with and alkylolamine at reaction temperature for a short period of time to produce the corresponding amide of said acid.

4. A process comprising heating 9,10-dihydroxystearic acid with 2-hydroxyethylamine at reaction temperature for about 15 minutes to produce N-(2-hydroxyethyl)-9,10-dihydroxystearamide.

DANIEL SWERN.
EDWARD T. ROE.
JOHN T. SCANLAN.

REFERENCES CITED

The following references are of record in the file of this patent:

UNITED STATES PATENTS

| Number | Name | Date |
|---|---|---|
| Re. 21,530 | Kritchevsky | Aug. 13, 1940 |
| 1,986,854 | Reid | Jan. 8, 1935 |
| 2,013,108 | Reppe et al. | Sept. 3, 1935 |
| 2,047,069 | Hentrich et al. | July 7, 1936 |

FOREIGN PATENTS

| Number | Country | Date |
|---|---|---|
| 418,247 | Great Britain | Oct. 22, 1934 |